United States Patent
Nilsson et al.

(10) Patent No.: US 9,994,219 B2
(45) Date of Patent: Jun. 12, 2018

(54) DEVICE AND METHOD FOR SAFETY STOPPAGE OF AN AUTONOMOUS ROAD VEHICLE

(71) Applicant: VOLVO CAR CORPORATION, Gothenburg (SE)

(72) Inventors: Jonas Nilsson, Molndal (SE); Erik Coelingh, Alvangen (SE); Trent Victor, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days. days.

(21) Appl. No.: 15/483,211

(22) Filed: Apr. 10, 2017

(65) Prior Publication Data

US 2017/0297569 A1    Oct. 19, 2017

(30) Foreign Application Priority Data

Apr. 15, 2016 (EP) .................................. 16165537

(51) Int. Cl.
*G01C 22/00* (2006.01)
*B60W 30/09* (2012.01)
(Continued)

(52) U.S. Cl.
CPC ............... *B60W 30/09* (2013.01); *B60T 7/00* (2013.01); *B60T 7/18* (2013.01); *B60T 7/22* (2013.01);
(Continued)

(58) Field of Classification Search
CPC ...... G08G 1/166; G08G 1/162; G05D 1/0061; G05D 1/0088; G05D 1/0257;
(Continued)

(56) References Cited

U.S. PATENT DOCUMENTS 8,874,301 B1    10/2014  Rao et al.
9,523,984 B1 *  12/2016  Herbach .............. B62D 15/025
(Continued)

FOREIGN PATENT DOCUMENTS

DE    102014212746    1/2015
WO    2015068249      5/2015

OTHER PUBLICATIONS

Extented European Search Report for European Application No. EP 16165537.8 , Completed by the European Patent Office, dated Oct. 26, 2016, 5 pages.

*Primary Examiner* — Hussein Elchanti
(74) *Attorney, Agent, or Firm* — Brooks Kushman P.C.

(57) ABSTRACT

A device and method for safety stoppage of an autonomous road vehicle having a localization system and sensors for monitoring the vehicle surroundings and motion, and a signal processing system for processing sensor signals enabling an autonomous drive mode. A processor continuously predicts where a drivable space exists, calculates and stores a safe trajectory to a stop within the drivable space, determines a current traffic situation, and determines any disturbances in sensor data, vehicle systems or components enabling the autonomous drive mode. If an incapacitating disturbance is determined, a request for a driver to take control is signaled and it is determined if the driver has assumed control. If not, the vehicle is controlled to follow the most recent safe trajectory to a stop in a safe stoppage maneuver during which, or after, one or more risk mitigation actions adapted to the determined current traffic situation are performed.

14 Claims, 3 Drawing Sheets

(51) Int. Cl.
- *G05D 1/00* (2006.01)
- *B60W 10/18* (2012.01)
- *B60W 10/20* (2006.01)
- *B60W 40/08* (2012.01)
- *B60W 50/14* (2012.01)
- *G05D 1/02* (2006.01)
- *G08G 1/16* (2006.01)
- *B60T 7/00* (2006.01)
- *B60T 7/18* (2006.01)
- *B60T 7/22* (2006.01)
- *B60W 50/16* (2012.01)

(52) U.S. Cl.
CPC ............ *B60W 10/18* (2013.01); *B60W 10/20* (2013.01); *B60W 40/08* (2013.01); *B60W 50/14* (2013.01); *G05D 1/0061* (2013.01); *G05D 1/0088* (2013.01); *G05D 1/0257* (2013.01); *G08G 1/162* (2013.01); *G08G 1/166* (2013.01); *B60T 2201/024* (2013.01); *B60W 50/16* (2013.01); *B60W 2040/0818* (2013.01); *B60W 2050/143* (2013.01); *B60W 2050/146* (2013.01); *B60W 2420/42* (2013.01); *B60W 2420/52* (2013.01); *B60W 2520/105* (2013.01); *B60W 2520/14* (2013.01); *B60W 2520/28* (2013.01); *B60W 2540/26* (2013.01); *B60W 2550/10* (2013.01); *B60W 2710/18* (2013.01); *B60W 2710/20* (2013.01); *G05D 2201/0213* (2013.01)

(58) Field of Classification Search
CPC ...... B60W 50/14; B60W 40/08; B60W 30/09; B60W 10/20; B60W 10/18; B60T 7/00; B60T 7/18; B60T 7/22
See application file for complete search history.

(56) References Cited

U.S. PATENT DOCUMENTS

| | | |
|---|---|---|
| 2011/0241862 A1 | 10/2011 | Debouk et al. |
| 2015/0179062 A1* | 6/2015 | Ralston .................. G01C 21/26 701/117 |
| 2016/0282874 A1* | 9/2016 | Kurata .................. G05D 1/0289 |
| 2017/0090480 A1* | 3/2017 | Ho ........................ G05D 1/0214 |
| 2017/0120753 A1* | 5/2017 | Kentley .................. B60L 3/0092 |
| 2017/0221279 A1* | 8/2017 | Yu ............................ G07C 5/02 |
| 2017/0274901 A1* | 9/2017 | Herbach ........... B60W 50/0225 |

* cited by examiner

DEVICE AND METHOD FOR SAFETY STOPPAGE OF AN AUTONOMOUS ROAD VEHICLE

CROSS-REFERENCE TO RELATED APPLICATIONS

This application claims foreign priority benefits under 35 U.S.C. § 119(a)-(d) to European patent application number EP 16165537.8, filed Apr. 15, 2016, which is incorporated by reference in its entirety.

TECHNICAL FIELD

The present disclosure relates to a safety stoppage device of an autonomous road vehicle having a localization system and sensors for monitoring the autonomous road vehicle surroundings and motion, and a signal processing system for processing sensor signals enabling an autonomous drive mode of the autonomous road vehicle by an autonomous drive control unit thereof.

The disclosure further relates to a method for safety stoppage of an autonomous road vehicle having a localization system and sensors for monitoring the autonomous road vehicle surroundings and motion, and a signal processing system for processing sensor signals enabling an autonomous drive mode of the autonomous road vehicle by an autonomous drive control unit thereof.

The disclosure still further relates to an autonomous road vehicle having a localization system and sensors for monitoring the autonomous road vehicle surroundings and motion, and a signal processing system for processing sensor signals enabling an autonomous drive mode of the autonomous road vehicle by an autonomous drive control unit of the autonomous road vehicle, that comprises a safety stoppage device as above.

BACKGROUND

One area of automotive vehicle technology that is evolving rapidly is the area of autonomous or semi-autonomous drive capabilities. This is enabled through the introduction of sensors, for sensing road vehicle motion and surroundings, and actuators, for controlling different road vehicle functionalities, such as steering, throttling and braking. Increased on-board data processing capabilities ties together these sensors and actuators such that the autonomous or semi-autonomous drive capabilities are enabled.

When a road vehicle runs in autonomous mode, which means that a driver thereof is not required to perform maneuvers, the road vehicle usually is dependent on multiple data sources as inputs to perform the autonomous driving, such as detection of surrounding vehicles, traffic lanes, obstacles, data from navigation systems and so on.

In the case where an automated function takes responsibility for a particular driving task, the risk level must be kept low. For an autonomous road vehicle, this means that the autonomous drive system must be capable to plan and realize a safe vehicle trajectory for all possible situations.

In case the autonomous road vehicle cannot guarantee safe driving over a longer time horizon, it must hand over control to the driver or bring the road vehicle to a stop, i.e. perform a safe maneuver. This may be required if for instance a fault is detected on a vital system component.

Stopping a road vehicle in a lane or on a shoulder of a road may in some situations increase the risk of an accident, most notably the risk of rear-end collisions. Consequently, in order to eliminate this risk it is desirable that a driver of the road vehicle is capable of taking over the driving task if the road vehicle needs to perform a safe maneuver. The road vehicle may in such cases be arranged to request the driver to take over by e.g. visual or audible communication.

A previous attempt at addressing these issues is provided by US 2011 241 862 A1, that relates to a method and system for ensuring operation of limited-ability autonomous driving vehicles that includes monitoring a plurality of specific conditions necessary for preferred and reliable use of limited-ability autonomous driving, and initiating a fault handling and degradation strategy configured to maneuver the vehicle to a preferred state if the driver is unable to manually control the vehicle when at least one of the specific conditions is either violated or will become violated. The vehicle can be maneuvered to—and stopped on the side of the road e.g. in response to determination of an "Inattentive Driver" or a critical failure.

The system according to US 2011 241 862 A1 may provide a warning as it attempts to re-gain the operator's attention to manually take control of the vehicle. The system may adjust warning options based on driver response or lack of response, and escalate or stop warnings. For instance, chimes may ring through an entertainment system of the vehicle, a voice may attempt to alert the operator, the operator's seat may vibrate, lights may flash on the instrument panel, or some other appropriate means may be used to re-gain the operator's attention.

The vehicle according to US 2011 241 862 A1 will in some instances be required to maneuver as soon as possible to the side of the road (e.g., shoulder), turn on the hazard lights, slow to a stop, and apply the parking brake. The vehicle may also be required to turn the hazard lights on, honk the horn, pop the hood after stopping, and request roadside assistance through a system such as OnStar. Furthermore, a driver monitoring system that includes monitoring the attentiveness of a driver may be included. The driver monitoring system can include, but is not limited to, interior cameras for monitoring the operator's eye gaze and/or head orientation to indicate if the driver is attentive and/or awake.

However, since during autonomous travel of the road vehicle the driver is no longer responsible for driving, it is difficult if not impossible to ensure that the driver is always capable of taking over the driving task. In a worst case scenario, the driver may be e.g. distracted with other tasks or even asleep.

Thus there is a need for an improved solution to safely handle a situation where an autonomous road vehicle must stop and a driver thereof is not capable of taking over control the road vehicle.

SUMMARY

Embodiments herein aim to provide an improved safety stoppage device to minimize, or at least reduce, the risk of an accident in the case where an autonomous road vehicle must stop and a driver thereof is not capable of taking over control the road vehicle.

This is provided through a safety stoppage device of an autonomous road vehicle having a localization system and sensors for monitoring the autonomous road vehicle surroundings and motion, and a signal processing system for processing sensor signals enabling an autonomous drive mode of the autonomous road vehicle by an autonomous drive control unit thereof, that comprises processing means arranged to continuously: predict where a drivable space exists, based on data from the sensors; calculate and store to memory means of the autonomous drive control unit a safe trajectory to a stop within the drivable space; determine from at least the localization system and the sensors a current traffic situation; determine any disturbances in sensor data, vehicle systems or components enabling the autonomous drive mode of the autonomous road vehicle; and if a disturbance is determined, such that the autonomous drive mode is incapacitated, signal to a driver environment of the autonomous road vehicle a request for a driver to take over control of the autonomous road vehicle and, determine if control of the autonomous road vehicle has been assumed by a driver thereof within a pre-determined time, and upon a negative determination thereof to control the autonomous road vehicle by the autonomous drive control unit to follow the most recently calculated safe trajectory to a stop within the drivable space in a safe stoppage maneuver, wherein, during performance of such a safe stoppage maneuver or after the autonomous road vehicle has stopped, the safety stoppage device further is arranged to perform one or more risk mitigation actions adapted to the determined current traffic situation.

According to a second embodiment the processing means further are arranged to continuously estimate a risk associated with performing the safe stoppage maneuver in the determined current traffic situation and to adapt the one or more risk mitigation actions to the estimated risk.

The provision of continuously estimating a risk associated with performing the safe stoppage maneuver in the determined current traffic situation and to adapt the one or more risk mitigation actions to the estimated risk provides for an even further reduced risk of an accident in the case where the autonomous vehicle must stop and the driver is not capable of taking over control the vehicle.

According to a third embodiment the processing means further are arranged to adapt at least one of timing and intensity of the one or more risk mitigation actions to the estimated risk.

The provision of adapting at least one of timing and intensity of the one or more risk mitigation actions to the estimated risk provides for an even further reduced risk of an accident in the case where the autonomous vehicle must stop and the driver is not capable of taking over control the vehicle as the one or more risk mitigation actions may be timed or scaled appropriately.

According to a fourth embodiment the processing means further are arranged to signal the request to take over control of the autonomous road vehicle to a driver environment of the autonomous road vehicle using means for visual, audible or haptic communication, or any combination thereof.

The provision of signaling the request to take over control of the autonomous road vehicle to a driver environment of the autonomous road vehicle using means for visual, audible or haptic communication, or any combination thereof, provides efficient means for alerting a driver of an autonomous road vehicle to the fact that a take over of control of the autonomous road vehicle is desirable.

According to a fifth embodiment the one or more risk mitigation actions comprises at least one of: increasing the magnitude of the request for a driver to take over control of the autonomous road vehicle; activating hazard lights of the autonomous road vehicle; activating a horn of the autonomous road vehicle; warning or informing other traffic participants trough vehicle-to-vehicle communication; notifying a traffic control center that a safe stoppage maneuver is in progress or completed; warning trailing vehicles by blinking tail or brake lights of the autonomous road vehicle.

The provision of having the one or more risk mitigation actions comprises at least one of the above listed actions provides for readily and efficiently even further reduction of the risk of an accident in the case where the autonomous vehicle must stop and the driver is not capable of taking over control the vehicle.

According to a sixth embodiment the safety stoppage device further is arranged to activate the one or more risk mitigation actions a predetermined time period after the autonomous road vehicle has come to a stop.

The provision of activating the one or more risk mitigation actions a predetermined time period after the autonomous road vehicle has come to a stop provides a suitable adaptation to a current traffic situation where the risk of an accident in the case where the autonomous vehicle must stop and the driver is not capable of taking over control the vehicle is not determined imminent.

According to a seventh embodiment the safety stoppage device further is arranged to activate the one or more risk mitigation actions during performance of the safe stoppage maneuver.

The provision of activating the one or more risk mitigation actions during performance of the safe stoppage maneuver provides a suitable adaptation to a current traffic situation where the risk of an accident in the case where the autonomous vehicle must stop and the driver is not capable of taking over control the vehicle is determined imminent.

According to an eighth embodiment that the safety stoppage device further is arranged to activate the one or more risk mitigation actions after the autonomous road vehicle has stopped.

The provision of activating the one or more risk mitigation actions after the autonomous road vehicle has stopped provides a suitable adaptation to a current traffic situation where the risk of an accident in the case where the autonomous vehicle must stop and the driver is not capable of taking over control the vehicle is determined possible but not imminent.

According to a ninth embodiment the safety stoppage device further comprises driver monitoring means for determining a physical state of a driver of the autonomous road vehicle and that the safety stoppage device further is arranged to adapt the one or more risk mitigation actions to the monitored physical state of a driver of the autonomous road vehicle.

The provision of determining and adapting the one or more risk mitigation actions to a monitored physical state of a driver of the autonomous road vehicle provides for further improving the adaptation of the one or more risk mitigation actions to the determined current traffic situation.

According to a tenth embodiment the safety stoppage device further is arranged to adapt the one or more risk mitigation actions to be performed earlier when the monitored physical state of a driver of the autonomous road vehicle indicates an incapacitated driver.

The provision of adapting the one or more risk mitigation actions to be performed earlier when the monitored physical state of a driver of the autonomous road vehicle indicates an incapacitated driver provides for further improved selection of appropriate risk mitigation actions and appropriated adaptation thereof to the determined current traffic situation.

According to an eleventh embodiment the safety stoppage device further is arranged to monitor and store to the memory means data related to safe stoppage maneuver incidents where a monitored physical state of a driver of the autonomous road vehicle indicates these safe stoppage maneuver incidents to be caused by a reckless driver and to deactivate the autonomous drive mode of the autonomous road vehicle after a predetermined number of such incidents.

The provision of deactivating the autonomous drive mode of the autonomous road vehicle after a predetermined number of safe stoppage maneuver incidents be caused by a reckless driver provides for improved safety by denying use of autonomous drive mode if a driver of the autonomous road vehicle is unsuited to take over control thereof if requested to.

According to a twelfth embodiment the safety stoppage device further comprises communication means for communicating with a traffic control center, such that the traffic control center is allowed to monitor the position of the autonomous road vehicle and trigger the safety stoppage device to perform the one or more risk mitigation actions when the monitored the position of the autonomous road vehicle indicates that it is stationary in a potentially unsafe position.

The provision of communicating with a traffic control center, such that the traffic control center is allowed to monitor the position of the autonomous road vehicle and trigger the safety stoppage device to perform the one or more risk mitigation actions when the monitored the position of the autonomous road vehicle indicates that it is stationary in a potentially unsafe position may provide for triggering the performance of the one or more risk mitigation actions even in case the on board vehicle systems are unable to do so, e.g. due to system faults.

Embodiments herein also aim to provide an improved method for safety stoppage of an autonomous vehicle minimizing the risk of an accident in the case where an autonomous road vehicle must stop and a driver thereof is not capable of taking over control the road vehicle.

Thus, according to an thirteenth embodiment a method is provided for safety stoppage of an autonomous road vehicle having a localization system and sensors for monitoring the autonomous road vehicle surroundings and motion, and a signal processing system for processing sensor signals enabling an autonomous drive mode of the autonomous road vehicle by an autonomous drive control unit thereof, that comprises using processing means for continuously: predicting where a drivable space exists, based on data from the sensors; calculating and storing to memory means of the autonomous drive control unit a safe trajectory to a stop within the drivable space; determining from at least the localization system and the sensors a current traffic situation; determining any disturbances in sensor data, vehicle systems or components enabling the autonomous drive mode of the autonomous road vehicle; and if a disturbance is determined, such that the autonomous drive mode is incapacitated, signaling to a driver environment of the autonomous road vehicle a request for a driver to take over control of the autonomous road vehicle and, determining if control of the autonomous road vehicle has been assumed by a driver thereof within a pre-determined time, and upon a negative determination thereof controlling the autonomous road vehicle by the autonomous drive control unit to follow the most recently calculated safe trajectory to a stop within the drivable space in a safe stoppage maneuver, and, during performance of such a safe stoppage maneuver or after the autonomous road vehicle has stopped, performing one or more risk mitigation actions adapted to the determined current traffic situation.

According to a final embodiment an autonomous road vehicle is provided having a localization system and sensors for monitoring the autonomous road vehicle surroundings and motion, and a signal processing system for processing sensor signals enabling an autonomous drive mode of the autonomous road vehicle by an autonomous drive control unit of the autonomous road vehicle, that comprises a safety stoppage device as above.

An autonomous road vehicle as above is able to minimize, or at least reduce, the risk of an accident in the case where an autonomous road vehicle must stop and a driver thereof is not capable of taking over control the road vehicle.

BRIEF DESCRIPTION OF THE DRAWINGS

In the following, embodiments herein will be described in greater detail by way of example only with reference to attached drawings, in which.

Still other features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
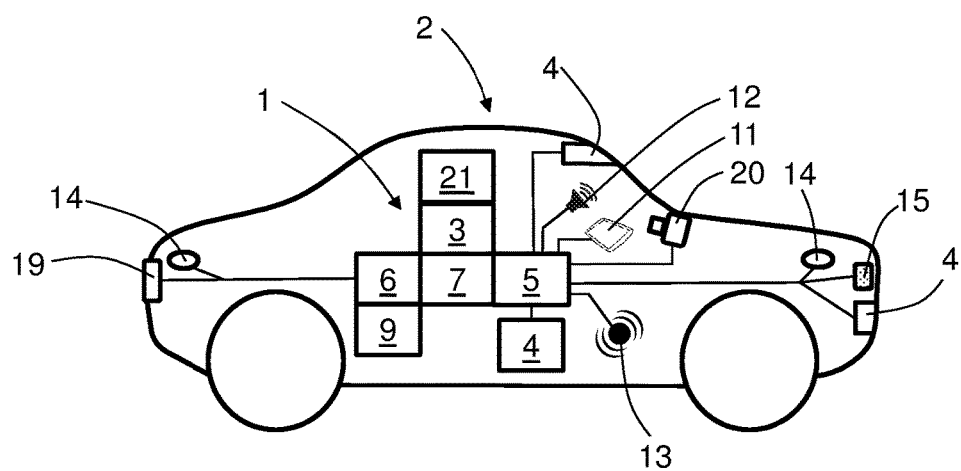
FIG. 1 is a schematic illustration of an autonomous road vehicle comprising a safety stoppage device according to embodiments herein.

The present disclosure proposes, and illustrates in FIG. 1, a solution to provide an improved safety stoppage device 1 capable to safely bring an autonomous road vehicle 2 to a halt and to minimize, or at least reduce, the risk of an accident in the case where the autonomous road vehicle 2 must stop and a driver thereof is not capable of taking over control of the road vehicle 2.

This is provided through a safety stoppage device 1 of an autonomous road vehicle 2 having a localization system 3. Such a localization system 3 may comprise one or more of a space based satellite navigation system, such as a Global Positioning System (GPS), The Russian GLObal NAvigation Satellite System (GLONASS), European Union Galileo positioning system, Chinese Compass navigation system, or Indian Regional Navigational Satellite System and/or other means to provide a current position of the autonomous road vehicle, such as feature based localization based on remote sensors 4.

The autonomous road vehicle 2 further has sensors 4 for monitoring the autonomous road vehicle 2 surroundings and motion. The sensors 4 for monitoring the autonomous road vehicle 2 surroundings may comprise one or more of a RADAR (RAdio Detection And Ranging) sensor, a LASER (Light Amplification by Stimulated Emission of Radiation) sensor, a LIDAR (LIght Detection And Ranging) sensor, and/or an imaging sensor, such as a camera based sensor. The sensors 4 for monitoring the autonomous road vehicle 2 motion include, but are not limited to, one or more of a velocity sensor, an acceleration sensor, a yaw rate sensor, a gyroscope, an inertial navigation or guidance system, a compass, a gyrocompass, a satellite navigation system (e.g. GPS) and a wheel speed sensor, etc.

The autonomous road vehicle 2 further has a signal processing system 5 for processing sensor signals enabling an autonomous drive mode of the autonomous road vehicle 2 by an autonomous drive control unit 6 thereof. The autonomous drive control unit 6 may comprise a processor and associated memory for receiving input from sensors 4 and generating output signals for controlling vehicle steering, braking or other systems to accomplish autonomous control of the vehicle.

The signal processing system 5 may comprise or be connected to one or more processing means 7. The one or more processing means 7 may be central processing units, CPUs, that carry out instructions of computer programs/software which when executed perform basic arithmetical, logical, and input/output operations. The signal processing system 5 may also comprise or be connected to one or more accelerated processing units, APUs, also referred to as advanced processing units. An APU is a processing unit that includes additional processing capability designed to accelerate one or more types of computations outside of a CPU.

Figure 2:
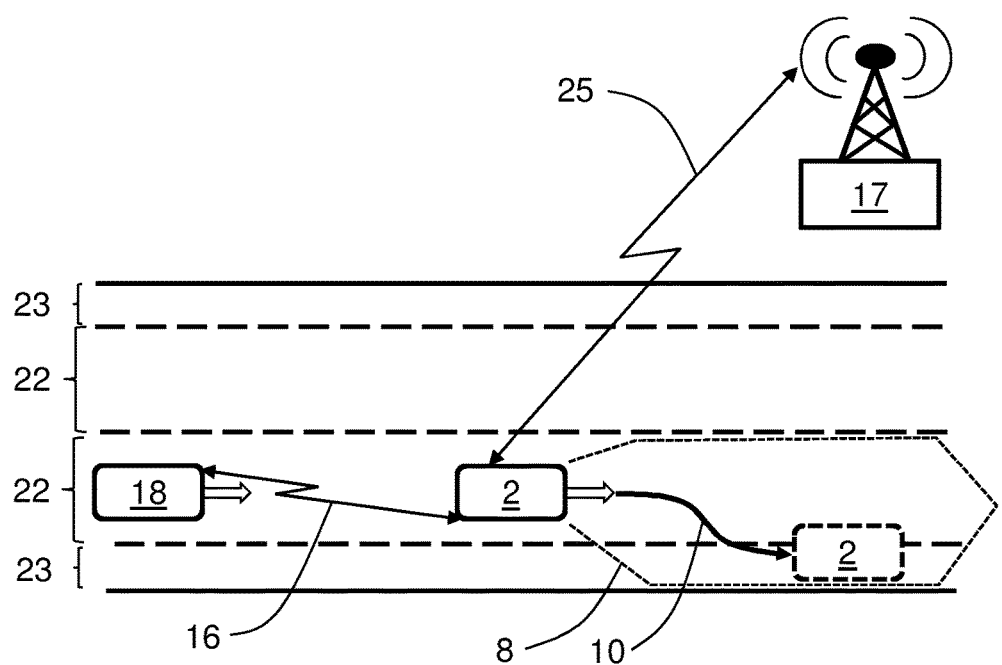
FIG. 2 is a schematic illustration of an autonomous road vehicle performing a safe stoppage maneuver according to embodiments herein.

The signal processing system 5 comprises processing means 7 and associated memory, such as those described above, arranged to continuously:

predict where a drivable space 8 exists, c.f. FIG. 2, based on data from the sensors 4;

calculate and store to memory means 9 of the autonomous drive control unit 6 a safe trajectory 10 to a stop within the drivable space 8, c.f. FIG. 2, i.e. taking into account any obstacles present within the drivable space 8, such as other vehicles, pedestrians and fixed roadside objects;

determine from at least the localization system 3 and the sensors 4 a current traffic situation;

determine any disturbances in sensor data, vehicle systems or components enabling the autonomous drive mode of the autonomous road vehicle 2.

Disturbances, as used herein, encompasses internal faults in sensors, vehicle systems and components that impair their ability to support the autonomous drive mode, as well as disturbances in sensor data, e.g. caused by external conditions such as a sudden occurrence of fog, blinding or impairing detection by some of the vehicle sensors. Disturbances, as used herein, also encompass external influences on vehicle systems and components that degenerate their ability to support the autonomous drive mode, e.g. such as a vehicle occupant pulling a steering wheel of the vehicle attempting to counteract the autonomous control.

If a disturbance is determined, such that the autonomous drive mode is incapacitated, the safety stoppage device 1 is arranged to signal to a driver environment of the autonomous road vehicle 2 a request for a driver to take over control of the autonomous road vehicle 2. Thereafter it is arranged to determine if control of the autonomous road vehicle 2 has been assumed by a driver thereof within a pre-determined time. Upon a negative determination thereof, i.e. a determination that a driver of the autonomous road vehicle 2 has not assumed within the pre-determined time, it is arranged to control the autonomous road vehicle 2 by the autonomous drive control unit 6 to follow the most recently calculated safe trajectory 10 to a stop within the drivable space 8 in a safe stoppage maneuver, c.f. FIG. 2. During performance of such a safe stoppage maneuver or after the autonomous road vehicle 2 has stopped, the safety stoppage device 1 further is arranged to perform one or more risk mitigation actions adapted to the determined current traffic situation.

Traffic situation, as used herein, encompasses determinable data related to: one or more of the movement or intended movement of other traffic participants; surrounding infrastructure; road conditions; weather conditions; light conditions; and data related to the movement of one's own vehicle.

Some details of the autonomous road vehicle 2, such as steering, braking and throttling control systems etc., are intentionally left out from FIG. 1, in order to no unnecessarily obscure details promoting the understanding of the safety stoppage device 1 according to the present disclosure. However, the person skilled in the art will readily be able to envisage such further details.

According to some embodiments of the safety stoppage device 1 it is provided that the processing means 7 further are arranged to continuously estimate a risk associated with performing the safe stoppage maneuver in the determined current traffic situation and to adapt the one or more risk mitigation actions to the estimated risk. Through continuously estimating a risk associated with performing the safe stoppage maneuver in the determined current traffic situation and to adapt the one or more risk mitigation actions to the estimated risk it is possible to further reduce the risk of an accident in the case where the autonomous vehicle 2 must stop and the driver is not capable of taking over control the vehicle 2.

Thus in yet some embodiments of the safety stoppage device 1 the processing means 7 further are arranged to adapt at least one of timing and intensity of the one or more risk mitigation actions to the estimated risk, e.g. if the vehicle 2 is stopped in-lane behind a hill crest the actions may be triggered faster and louder compared to if the vehicle 2 stopped on the shoulder of the road. In this way it is possible to, in a simple and convenient manner, even further reduce the risk of an accident in the case where the autonomous vehicle 2 must stop and the driver is not capable of taking over control the vehicle 2. This as the one or more risk mitigation actions may be timed or scaled appropriately to a current traffic situation.

According to still some embodiments of the safety stoppage device 1, it is provided that the processing means 7 further are arranged to signal the request to take over control of the autonomous road vehicle 2 to a driver environment of the autonomous road vehicle 2 using means 11, 12, 13 for visual, audible or haptic communication, or any combination thereof. Means for visual communication 11 may e.g. be lighted symbols, warning lights, symbols or messages displayed to one or more display screens in a driver environment of the autonomous road vehicle 2. Audible communication may e.g. be warning messages or sounds emitted to a driver environment of the autonomous road vehicle 2 through a vehicle 2 sound and/or entertainment system or using dedicated acoustic presentation means 12. Haptic communication may e.g. be made by means for causing vibrations 13 to a steering wheel, a foot pedal or at least part of a driver's seat, in order to convey or enhance the request to take over control of the autonomous road vehicle 2 to a driver thereof. Hereby it is possible to provide an efficient means for alerting a driver of an autonomous road vehicle 2 to the fact that a take over of control of the autonomous road vehicle 2 is desirable.

According to further embodiments of the safety stoppage device 1, it is provided that the one or more risk mitigation actions comprises at least one of: increasing the magnitude of the request for a driver to take over control of the autonomous road vehicle 2; activating hazard lights 14 of the autonomous road vehicle 2; activating a horn 15 of the autonomous road vehicle 2; warning or informing other traffic participants trough vehicle-to-vehicle communication; notifying a traffic control center 17 that a safe stoppage maneuver is in progress or completed; warning trailing vehicles 18 by blinking tail or brake lights 19 of the autonomous road vehicle 2 or through similarly providing a rear collision warning thereto.

Through increasing the magnitude of the request for a driver to take over control of the autonomous road vehicle 2 the attention of an inattentive driver to the task of taking over control of the vehicle 2 is heightened, usually decreasing the time until a take over is performed by the driver, thus increasing the safety of the situation.

Through activating hazard lights 14 of the autonomous road vehicle 2 adjacent traffic participants are made aware of the fact that the vehicle 2 has encountered an undesired situation, thus increasing the safety of the situation through allowing adjacent traffic participants to take appropriate measures. The same effect is achieved by activating a horn 15 of the autonomous road vehicle 2, either alone or in combination with the activation of hazard lights 14. Furthermore, trailing vehicles 18 may be warned by blinking tail or brake lights 19 of the autonomous road vehicle 2 or through similarly providing a rear collision warning thereto.

Similarly, adjacent traffic participants can be made aware of the risk by warning or informing other traffic participants trough vehicle-to-vehicle communication, thus increasing the safety of the situation.

Through notifying a traffic control center 17 that a safe stoppage maneuver is in progress or completed it is also possible to improve safety, this as information and/or warnings may be provided from the traffic control center 17 to adjacent traffic participants either by direct communications thereto or by communications provided through roadside installations, such as electronic road signs.

Thus, the above provisions serves to even further reduction of the risk of an accident in the case where the autonomous vehicle 2 must stop and the driver is not capable of taking over control the vehicle 2.

According to yet some embodiments, it is provided that the safety stoppage device 1 further is arranged to activate the one or more risk mitigation actions a predetermined time period after the autonomous road vehicle 2 has come to a stop. Through activating the one or more risk mitigation actions a predetermined time period after the autonomous road vehicle 2 has come to a stop provides a suitable adaptation to a current traffic situation where the risk of an accident in the case where the autonomous vehicle 2 must stop and the driver is not capable of taking over control the vehicle 2 is not determined imminent.

However, in order to provide a suitable adaptation to a current traffic situation where the risk of an accident in the case where the autonomous vehicle 2 must stop and the driver is not capable of taking over control the vehicle 2 is determined imminent, according to a still further embodiment it is provided that the safety stoppage device 1 further is arranged to activate the one or more risk mitigation actions during performance of the safe stoppage maneuver.

Furthermore, in order to provide a suitable adaptation to a current traffic situation where the risk of an accident in the case where the autonomous vehicle 2 must stop and the driver is not capable of taking over control the vehicle 2 is determined possible but not imminent, it is provided that the safety stoppage device 1 further is arranged to activate the one or more risk mitigation actions after the autonomous road vehicle 2 has stopped.

In order to further improve the adaptation of the one or more risk mitigation actions to the determined current traffic situation it is, according to further embodiments, provided that the safety stoppage device 1 further comprises driver monitoring means 20, such as e.g. a driver monitoring camera, for determining a physical state of a driver of the autonomous road vehicle 2, and that the safety stoppage device 1 further is arranged to adapt the one or more risk mitigation actions to the monitored physical state of a driver of the autonomous road vehicle 2.

In yet some embodiments the safety stoppage device 1 is further arranged to adapt the one or more risk mitigation actions to be performed earlier when the monitored physical state of a driver of the autonomous road vehicle 2 indicates an incapacitated driver. This provides for further improved selection of appropriate risk mitigation actions and appropriated adaptation thereof to the determined current traffic situation. It is possible to e.g. increase the magnitude, i.e. volume, of the request for a driver to take over control of the autonomous road vehicle 2 if a sleeping driver is detected by the driver monitoring means 20.

Where a monitored physical state of a driver of the autonomous road vehicle 2 indicates these safe stoppage maneuver incidents to be caused by a reckless driver the safety stoppage device 1 is, according to still some embodiments, arranged to monitor and store to the memory means 9 data related to safe stoppage maneuver incidents where a monitored physical state of a driver of the autonomous road vehicle 2 indicates these safe stoppage maneuver incidents to be caused by a reckless driver and to deactivate the autonomous drive mode of the autonomous road vehicle 2 after a predetermined number n of such incidents. The predetermined number n may e.g. be 3 to 5 times, or any number found suitable. Through deactivating the autonomous drive mode of the autonomous road vehicle 2 after such a predetermined number n of safe stoppage maneuver incidents caused by a reckless driver, it is provided for improved safety, which is achieved by denying use of autonomous drive mode if a driver of the autonomous road vehicle 2 is unsuited to take over control thereof when requested to do so.

In some further embodiments the safety stoppage device 1 comprises communication means 21 for communicating with a traffic control center 17, such as an arrangement for wireless communication and in particular data communication over e.g. a cellular network or similar, such that the traffic control center 17 is allowed to monitor the position of the autonomous road vehicle 2 and trigger the safety stoppage device 1 to perform the one or more risk mitigation actions when the monitored the position of the autonomous road vehicle 2 indicates that it is stationary in a potentially unsafe position, e.g. if the vehicle 2 is stopped in lane behind a hill crest or similar. The traffic control center 17 can also e.g. call the driver or send assistance to the stopped vehicle 2. This provides for triggering the performance of the one or more risk mitigation actions even in case the on board vehicle systems are unable to do so, e.g. due to system faults.

FIG. 2 is a schematic illustration of an autonomous road vehicle 2 performing a safe stoppage maneuver according to embodiments herein. The vehicle 2 is travelling along a road lane 22 when a disturbance is determined in either of sensor data, vehicle systems or components enabling the autonomous drive mode of the autonomous road vehicle 2, such that the autonomous drive mode is incapacitated. The safety stoppage device 1 signals to a driver environment of the vehicle 2 a request for a driver to take over control of the vehicle. Thereafter it determines that control of the vehicle 2 has not been assumed by a driver thereof within a pre-determined time. Thus, as a consequence the vehicle 2 performs a safe stoppage maneuver and follows a most recently calculated safe trajectory 10 within a drivable space 8 from an initial position, vehicle 2 shown in solid lines, to a position, vehicle 2 shown in dashed lines, where the vehicle 2 is stopped at least partially on a shoulder 23 of the road. During performance of the safe stoppage maneuver or after the autonomous road vehicle 2 has stopped, one or more risk mitigation actions as elucidated above are performed, which risk mitigation actions are adapted to the determined current traffic situation.

The one or more risk mitigation actions comprises at least one of: increasing the magnitude of the request for a driver to take over control of the autonomous road vehicle 2; activating hazard lights 14 of the autonomous road vehicle 2; activating a horn 15 of the autonomous road vehicle 2; warning or informing other traffic participants trough vehicle-to-vehicle communication, illustrated by the broken arrow 16; notifying a traffic control center 17, through communication illustrated by the broken arrow 25, that a safe stoppage maneuver is in progress or completed; warning trailing vehicles 18 by blinking tail or brake lights 19 of the autonomous road vehicle 2 or through similarly providing a rear collision warning thereto.

Figure 3:
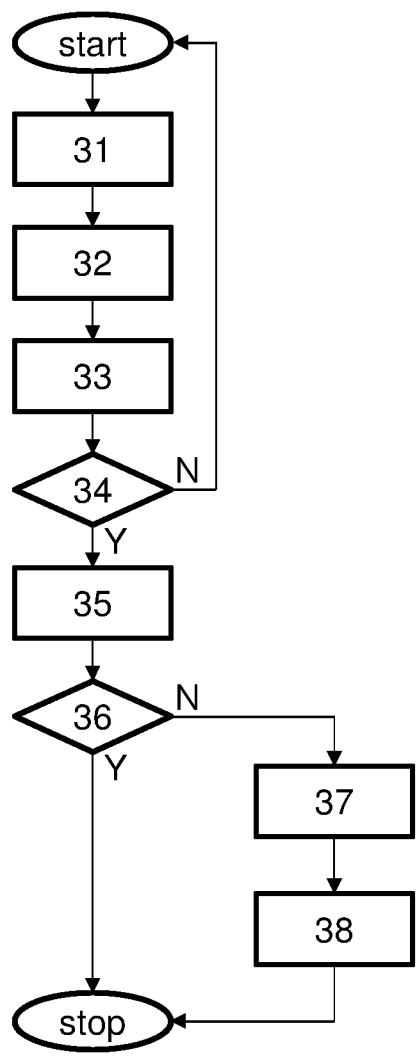
FIG. 3 is a schematic illustration of a method for safety stoppage of an autonomous road vehicle according to embodiments herein.

Embodiments herein also aim to provide an improved method, as illustrated schematically in FIG. 3, for safety stoppage of an autonomous vehicle 2 minimizing or at least reducing the risk of an accident in the case where an autonomous road vehicle 2 must stop and a driver thereof is not capable of taking over control the road vehicle 2.

Thus, such embodiments provide for a method for safety stoppage of an autonomous road vehicle 2 having a localization system 3 and sensors 4 for monitoring the autonomous road vehicle 2 surroundings and motion, and a signal processing system 5 for processing sensor signals enabling an autonomous drive mode of the autonomous road vehicle 2 by an autonomous drive control unit 6 thereof, that comprises using processing means 7 for continuously:

31 predicting where a drivable space 8 exists, based on data from the sensors 4;

32 calculating and storing to memory means 9 of the autonomous drive control unit 6 a safe trajectory 10 to a stop within the drivable space 8;

33 determining from at least the localization system 3 and the sensors 4 a current traffic situation;

34 determining any disturbances in sensor data, vehicle systems or components enabling the autonomous drive mode of the autonomous road vehicle 2;

and if a disturbance is determined, such that the autonomous drive mode is incapacitated, 35 signaling to a driver environment of the autonomous road vehicle 2 a request for a driver to take over control of the autonomous road vehicle 2, if no disturbance is determined the method loops back and starts over again, after a disturbance has been determined the method continues by 36 determining if control of the autonomous road vehicle 2 has been assumed by a driver thereof within a pre-determined time, and upon a negative determination thereof the method continues by 37 controlling the autonomous road vehicle 2 by the autonomous drive control unit 6 to follow the most recently calculated safe trajectory 10 to a stop within the drivable space 8 in a safe stoppage maneuver, and, during performance of such a safe stoppage maneuver or after the autonomous road vehicle 2 has stopped, 38 performing one or more risk mitigation actions adapted to the determined current traffic situation in one or more of the ways elucidated in the foregoing.

If determined that control of the autonomous road vehicle 2 has been assumed by a driver thereof within a pre-determined time, the driver assumes responsibility for bringing the vehicle 2 safely to a halt and for performing appropriate risk mitigation actions.

Finally there is provided an autonomous road vehicle 2, as illustrated in FIG. 1, having a localization system 3 and sensors 4 for monitoring the autonomous road vehicle 2 surroundings and motion, and a signal processing system 5 for processing sensor signals enabling an autonomous drive mode of the autonomous road vehicle 2 by an autonomous drive control unit 6 of the autonomous road vehicle 2, that comprises a safety stoppage device 1 as above. An autonomous road vehicle 2 as above is able to minimize, or at least reduce, the risk of an accident in the case where an autonomous road vehicle 2 must stop and a driver thereof is not capable of taking over control the road vehicle.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A safety stoppage device of an autonomous road vehicle having a localization system and sensors for monitoring surroundings and motion of the autonomous road vehicle, and a signal processing system for processing sensor signals enabling an autonomous drive mode of the autonomous road vehicle by an autonomous drive control unit thereof, the safety stoppage device comprising processing means configured to:

predict where a drivable space exists, based on data from the sensors;

periodically calculate and store to memory means of the autonomous drive control unit a safe trajectory to a stop within the drivable space;
determine from at least the localization system and the sensors a current traffic situation;
determine any disturbances in sensor data, vehicle systems or components enabling the autonomous drive mode of the autonomous road vehicle;
if a disturbance is determined, such that the autonomous drive mode is incapacitated, signal to a driver environment of the autonomous road vehicle a request for a driver to take over control of the autonomous road vehicle;
determine if control of the autonomous road vehicle has been assumed by a driver thereof within a pre-determined time; and
upon a negative determination, control the autonomous vehicle by the autonomous drive control unit to follow the most recently calculated safe trajectory to a stop within the drivable space in a safe stoppage maneuver;
wherein, during performance of such a safe stoppage maneuver or after the autonomous road vehicle has stopped, the safety stoppage device further is configured to perform one or more risk mitigation actions adapted to the determined current traffic situation.

2. The safety stoppage device according to claim 1 wherein the processing means is further arranged to continuously estimate a risk associated with performing the safe stoppage maneuver in the determined current traffic situation and to adapt the one or more risk mitigation actions to the estimated risk.

3. The safety stoppage device according to claim 2 wherein the processing means is further arranged to adapt at least one of timing and intensity of the one or more risk mitigation actions to the estimated risk.

4. The safety stoppage device according claim 1 wherein the processing means is further arranged to signal the request to take over control of the autonomous road vehicle to a driver environment of the autonomous road vehicle using means for visual, audible or haptic communication, or any combination thereof.

5. The safety stoppage device according claim 1 wherein the one or more risk mitigation actions comprises at least one of: increasing the magnitude of the request for a driver to take over control of the autonomous road vehicle; activating hazard lights of the autonomous road vehicle; activating a horn of the autonomous road vehicle; warning or informing other traffic participants trough vehicle-to-vehicle communication; notifying a traffic control center that a safe stoppage maneuver is in progress or completed; and warning trailing vehicles by blinking tail or brake lights of the autonomous road vehicle.

6. The safety stoppage device according to claim 1 wherein the safety stoppage device is further arranged to activate the one or more risk mitigation actions a predetermined time period after the autonomous road vehicle has come to a stop.

7. The safety stoppage device according to claim 1 wherein the safety stoppage device is further arranged to activate the one or more risk mitigation actions during performance of the safe stoppage maneuver.

8. The safety stoppage device according to claim 1 wherein the safety stoppage device is further arranged to activate the one or more risk mitigation actions after the autonomous vehicle has stopped.

9. The safety stoppage device according to claim 1 further comprising driver monitoring means for determining a physical state of a driver of the autonomous road vehicle and that the safety stoppage device further is arranged to adapt the one or more risk mitigation actions to the monitored physical state of a driver of the autonomous road vehicle.

10. The safety stoppage device according to claim 9 wherein the safety stoppage device is further arranged to adapt the one or more risk mitigation actions to be performed earlier when the monitored physical state of a driver of the autonomous road vehicle indicates an incapacitated driver.

11. The safety stoppage device according to claim 9 wherein the safety stoppage device is further arranged to monitor and store to the memory means data related to safe stoppage maneuver incidents where a monitored physical state of a driver of the autonomous road vehicle indicates these safe stoppage maneuver incidents to be caused by a reckless driver and to deactivate the autonomous drive mode of the autonomous road vehicle after a predetermined number of such incidents.

12. The safety stoppage device according to claim 1 further comprising communication means for communicating with a traffic control center, such that the traffic control center is allowed to monitor the position of the autonomous road vehicle and trigger the safety stoppage device to perform the one or more risk mitigation actions when the monitored the position of the autonomous road vehicle indicates that it is stationary in a potentially unsafe position.

13. A method for safety stoppage of an autonomous road vehicle having a localization system and sensors for monitoring surroundings and motion of the autonomous road vehicle, a signal processing system for processing sensor signals enabling an autonomous drive mode of the autonomous road vehicle by an autonomous drive control unit thereof, the method comprising:
predicting where a drivable space exists, based on data from the sensors;
periodically calculating and storing to memory means of the autonomous drive control unit a safe trajectory to a stop within the drivable space;
determining from at least the localization system and the sensors a current traffic situation;
determining any disturbances in sensor data, vehicle systems or components enabling the autonomous drive mode of the autonomous road vehicle;
if a disturbance is determined, such that the autonomous drive mode is incapacitated, signaling to a driver environment of the autonomous road vehicle a request for a driver to take over control of the autonomous road vehicle;
determining if control of the autonomous road vehicle has been assumed by a driver thereof within a pre-determined time;
upon a negative determination, controlling the autonomous vehicle by the autonomous drive control unit to follow the most recently calculated safe trajectory to a stop within the drivable space in a safe stoppage maneuver; and
during performance of such a safe stoppage maneuver or after the autonomous road vehicle has stopped, performing one or more risk mitigation actions adapted to the determined current traffic situation.

14. An autonomous road vehicle having a localization system and sensors for monitoring the autonomous road vehicle surroundings and motion, and a signal processing system for processing sensor signals enabling an autonomous drive mode of the autonomous road vehicle by an autonomous drive control unit of the autonomous road vehicle, the vehicle comprising a safety stoppage, the safety stoppage device comprising processing means configured to:
- predict where a drivable space exists, based on data from the sensors;
- periodically calculate and store to memory means of the autonomous drive control unit a safe trajectory to a stop within the drivable space;
- determine from at least the localization system and the sensors a current traffic situation;
- determine any disturbances in sensor data, vehicle systems or components enabling the autonomous drive mode of the autonomous road vehicle;
- if a disturbance is determined, such that the autonomous drive mode is incapacitated, signal to a driver environment of the autonomous road vehicle a request for a driver to take over control of the autonomous road vehicle;
- determine if control of the autonomous road vehicle has been assumed by a driver thereof within a pre-determined time; and
- upon a negative determination, control the autonomous vehicle by the autonomous drive control unit to follow the most recently calculated safe trajectory to a stop within the drivable space in a safe stoppage maneuver;
- wherein, during performance of such a safe stoppage maneuver or after the autonomous road vehicle has stopped, the safety stoppage device further is configured to perform one or more risk mitigation actions adapted to the determined current traffic situation.

* * * * *

UNITED STATES PATENT AND TRADEMARK OFFICE
CERTIFICATE OF CORRECTION

| | | |
|---|---|---|
| PATENT NO. | : 9,994,219 B2 | Page 1 of 1 |
| APPLICATION NO. | : 15/483211 | |
| DATED | : June 12, 2018 | |
| INVENTOR(S) | : Jonas Nilsson et al. | |

It is certified that error appears in the above-identified patent and that said Letters Patent is hereby corrected as shown below:

In the Claims

Column 13, Line 36, Claim 4:
After "The safety stoppage device according"
Insert -- to --.

Column 13, Line 42, Claim 5:
After "The safety stoppage device according"
Insert -- to --.

Column 14, Line 26, Claim 12:
After "when the monitored"
Delete "the".

Column 15, Line 1, Claim 14:
After "comprising a safety stoppage"
Insert -- device --.

Signed and Sealed this
Twenty-third Day of October, 2018

Andrei Iancu
*Director of the United States Patent and Trademark Office*